(12) United States Patent
Bondu

(10) Patent No.: US 9,421,830 B2
(45) Date of Patent: *Aug. 23, 2016

(54) BEAD OF A TIRE FOR A HEAVY VEHICLE OF CONSTRUCTION PLANT TYPE

(75) Inventor: Lucien Bondu, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 181 days.

This patent is subject to a terminal disclaimer.

(21) Appl. No.: 14/123,914

(22) PCT Filed: Jun. 6, 2012

(86) PCT No.: PCT/EP2012/060646
§ 371 (c)(1),
(2), (4) Date: Feb. 18, 2014

(87) PCT Pub. No.: WO2012/168270
PCT Pub. Date: Dec. 13, 2012

(65) Prior Publication Data
US 2014/0158272 A1  Jun. 12, 2014

(30) Foreign Application Priority Data
Jun. 7, 2011 (FR) ...................... 11 54926

(51) Int. Cl.
*B60C 15/00* (2006.01)
*B60C 15/06* (2006.01)

(52) U.S. Cl.
CPC ......... *B60C 15/0009* (2013.04); *B60C 15/0603* (2013.04); *B60C 15/0607* (2013.04); *B60C 2015/061* (2013.04); *B60C 2015/0614* (2013.04); *B60C 2015/0621* (2013.04)

(58) Field of Classification Search
CPC  B60C 15/00; B60C 15/0009; B60C 15/0063; B60C 15/06; B60C 15/0603; B60C 15/0607
See application file for complete search history.

(56) References Cited

U.S. PATENT DOCUMENTS

| 4,471,828 A | 9/1984 | Kishida et al. |
| 5,131,447 A * | 7/1992 | Nakagawa ............... B60C 15/06 152/543 |

(Continued)

FOREIGN PATENT DOCUMENTS

| EP | 0317488 A2 | 5/1989 |
| EP | 2216189 A1 | 8/2010 |

(Continued)

OTHER PUBLICATIONS

A Chinese Office Action issued on May 18, 2015 for CN100738.
PCT/EP2012/060646—International Search Report (English translation included), dated Aug. 10, 2012, 3 pages.
An Eurasian Office Action issued on Oct. 19, 2015 for Application No. 201391824/31.

*Primary Examiner* — Justin Fischer
(74) *Attorney, Agent, or Firm* — Dickinson Wright PLLC

(57) ABSTRACT

The invention relates to improving the endurance of the beads of a radial tire for a heavy vehicle of construction plant type by reducing the cracking that starts at the end of the turn-up and spreads through the polymer coating, edging and filling materials. According to the invention, a transition element, made of a polymer transition material, is at least partially in contact, on its axially outer face, with the polymer edging material and, on its axially inner face, with a polymer filling material, the radially outer and radially inner ends of the transition element are respectively radially on the outside and radially on the inside of the end of the turn-up and the elastic modulus at 10% elongation of the polymer transition material is somewhere between the respective elastic moduluses at 10% elongation of the polymer edging material and of the polymer filling material with which the transition element is in contact.

11 Claims, 2 Drawing Sheets

(56) References Cited

U.S. PATENT DOCUMENTS

| | | | | |
|---|---|---|---|---|
| 5,236,031 A | * | 8/1993 | Honbo | B60C 15/0027 152/541 |
| 5,433,257 A | | 7/1995 | Yamaguchi et al. | |
| 8,960,253 B2 | * | 2/2015 | Bondu | B60C 15/06 152/539 |
| 2007/0113944 A1 | | 5/2007 | Ueyoko et al. | |
| 2009/0056851 A1 | * | 3/2009 | Maruoka | B60C 15/060 152/543 |
| 2010/0252164 A1 | | 10/2010 | Oogane | |

FOREIGN PATENT DOCUMENTS

| | | | |
|---|---|---|---|
| JP | 61232905 A | | 10/1986 |
| JP | 2000-301919 | * | 10/2000 |
| JP | 2006-15951 A | | 1/2006 |
| JP | 2006015951 A | | 1/2006 |
| JP | 2009-113715 a | | 5/2009 |

* cited by examiner

BEAD OF A TIRE FOR A HEAVY VEHICLE OF CONSTRUCTION PLANT TYPE

This application claims benefit of the filing date of PCT/EP2012/060646, filed Jun. 6, 2012, which claims the benefit of FR1154926, filed Jun. 7, 2011, the entire contents of each of which are incorporated herein by reference for all purposes.

BACKGROUND

1. Field

The present invention relates to a radial tire intended to be fitted to a heavy vehicle of construction plant type.

2. Description of Related Art

Although not restricted to this type of application, the invention will be more particularly described with reference to a radial tire intended to be mounted on a damper, a vehicle for transporting materials extracted from quarries or open cast mines. The nominal diameter of the rim of such a tire, within the meaning of the European Tire and Rim Technical Organisation (ETRTO) standard, is a minimum of 25".

The following definitions apply in what follows:

"Meridian plane": a plane containing the axis of rotation of the tire.
"Equatorial plane": the plane passing through the middle of the tire tread surface and perpendicular to the axis of rotation of the tire.
"Radial direction": a direction perpendicular to the axis of rotation of the tire.
"Axial direction": a direction parallel to the axis of rotation of the tire.
"Circumferential direction": a direction perpendicular to a meridian plane.
"Radial distance": a distance measured perpendicular to the axis of rotation of the tire and from the axis of rotation of the tire.
"Axial distance": a distance measured parallel to the axis of rotation of the tire and from the equatorial plane.
"Radially": in a radial direction.
"Axially": in an axial direction.
"Radially on the inside, or respectively radially on the outside": which is situated at a smaller or greater radial distance, respectively.
"Axially on the inside, or respectively axially on the outside": which is situated at a smaller or greater axial distance, respectively.

A tire comprises two beads which provide the mechanical connection between the tire and the rim on which it is mounted, the beads being joined respectively by two sidewalls to a tread intended to come into contact with the ground via a tread surface.

A radial tire more particularly comprises a reinforcement, comprising a crown reinforcement radially on the inside of the tread, and a carcass reinforcement radially on the inside of the crown reinforcement.

The carcass reinforcement of a radial tire for a heavy vehicle of construction plant type usually comprises at least one carcass reinforcement layer made up of metallic reinforcing elements coated in a polymer coating material. The metallic reinforcing elements are substantially parallel to one another and make an angle of between 85° and 95° with the circumferential direction. The carcass reinforcement layer comprises a main part, joining the two beads together and wrapped, within each bead, around a bead wire. The bead wire comprises a circumferential reinforcing element, usually made of metal, surrounded by at least one material, which, and this list is not exhaustive, may be made of polymer or textile. The carcass reinforcement layer is wrapped around the bead wire from the inside towards the outside of the tire to form a turn-up having an end. The turn-up, within each bead, allows the carcass reinforcement layer to be anchored to the bead wire of that bead.

The end of the turn-up is often covered, on both its axially inner and axially orate faces respectively, by an edging element made of a polymer edging material, usually of the same chemical composition as the polymer coating material, but which may be different. The edging element thus constitutes an additional thickness of polymer coating material at the end of the turn-up.

Each bead also comprises a filling element which extends the bead wire radially outwards. The filling element is made of at least one polymer filling material. The filling element may be made of a radial stack of at least two polymer filling materials which are in contact along a contact surface that intersects any meridian plane along a meridian line. The filling element axially separates the main part from the turn-up.

A polymer material, after curing, is mechanically characterized by tensile stress-deformation characteristics which are determined by tensile testing. This tensile testing is carried out by a person skilled in the art, on a test specimen, according to a known method, for example in accordance with international standard ISO 37, and under standard temperature (23° C.+ or −2° C.) and moisture (50%+ or −5% relative humidity) conditions defined by international standard ISO 471. For a polymer material, the elastic modulus at 10% elongation, expressed in mega pascals (MPa), is the name given to the tensile stress measured for a 10% elongation of the test specimen.

A polymer material, after curing, is also mechanically characterized by its hardness. The hardness is notably defined by the Shore A hardness determined in accordance with standard ASTM D 2240-86.

When the vehicle is being driven along, the tire, mounted on its rim, inflated and compressed under the load of the vehicle, is subjected to bending cycles, particularly in its beads and its sidewalls.

The bending cycles lead to variations in curvature which are combined with variations in the tension of the metallic reinforcing elements of the main part and of the turn-up.

Considering that a bead behaves mechanically in bending like a beam the respectively outer and inner axes of which are the main part and the turn-up, the turn-up, subjected to the bending cycles, undergoes compressive deformations likely to lead to its fatigue failure and therefore to a reduction in the endurance of the bead and in the life of the tire.

Document EP 2 216 189 describes a tire bead the endurance of which is improved by reducing the compressive deformations in the turn-up when the bead flexes on the rim when in use. This objective is achieved by a turn-up which is such that the distance between the turn-up and the main part decreases continuously, radially towards the outside, from the bead wire, as far as a minimum distance, and then increases continuously as far as a maximum distance. The turn-up extends radially on the outside of that point of the turn-up that corresponds to the maximum distance between the turn-up and the main part.

The bending cycles also lead to stresses and deformations in the polymer coating, edging and filling materials situated in close proximity to the end of the turn-up.

More specifically, the stresses and deformations in close proximity to the end of the turn-up cause cracks, which start at the end of the turn-up, to spread, more particularly in the case of reinforcing elements made of metal, these cracks being likely to lead to a reduction in the endurance of the bead and in the life of the tire.

According to the inventors, the cracks start mainly as a result of a lack of adhesion between the ends of the metallic reinforcing elements of the turn-up and the polymer coating, edging or filling materials in contact with the said ends. The increase in bead temperature, during the bending cycles, accentuates the lack of adhesion that already exists in the new tire.

The cracks spread through the polymer coating, edging and filling materials and lead to degradation of the bead, and therefore failure of the tire. The rate at which the cracks spread depends firstly on the amplitude and frequency of the stress and deformation cycles, and secondly on the respective stiffnesses of the to polymer coating, edging and filling materials in the crack zone.

Document U.S. Pat. No. 3,921,693 has already described, in the case of a tire with a radial carcass reinforcement the reinforcing elements of which are metallic, beads the design of which is aimed at preventing cracks at the ends of the turn-up. In the technical solution proposed, the end of the turn-up is covered with a polymer material the Shore A hardness of which is greater than that of the polymer filling material or materials.

Document U.S. Pat. No. 4,086,948 has also described, with a view to increasing the life of a radial tire for a heavy vehicle, a turn-up that is tall, i.e. the end of which is radially on the outside of the straight line passing through the axially outermost points of the sidewalls of the tire. In addition, the polymer coating material of the metallic reinforcing elements of the carcass reinforcement has a Shore A hardness and a modulus of elasticity at 300% elongation that are respectively higher than the Shore A hardness and than the elastic modulus at 300% elongation of the polymer filling material.

Finally, document U.S. Pat. No. 5,056,575 describes a bead of a tire for a heavy vehicle, such as trucks and buses, that makes it possible to reduce deformations and slow the spread of cracks in the polymer material in the vicinity of the end of the turn-up, with a view to increasing the endurance of the bead. The technical solution proposed is a bead that has three polymer filling materials of which the elastic moduluses at 100% elongation decrease from the polymer filling material adjacent to the turn-up which is also the radially outermost, to the polymer filling material adjacent to the bead wire which is also the radially innermost.

The inventors have set themselves the objective of increasing the endurance of the beads of a radial tire for a heavy vehicle of construction plant type by reducing the cracking that starts at the end of the turn-up and spreads through the polymer coating, edging and filling materials.

SUMMARY

According to the invention, this objective has been achieved by:

a tire for a heavy vehicle of construction plant type comprising two beads intended to come into contact with a rim, a carcass reinforcement comprising at least one carcass reinforcement layer made up of metallic reinforcing elements, the carcass reinforcement layer comprising a main part wrapped, within each bead, from the inside towards the outside of the tire, around a bead wire to form a turn-up, the distance between the turn-up and the main part decreasing continuously, radially towards the outside, from the bead wire, as far as a minimum distance, then increasing continuously as far as a maximum distance, the turn-up comprising an end covered by an edging element made of a polymer edging material, each bead comprising a filling element extending the bead wire radially towards the outside and made of at least one polymer filling material, the polymer filling material in contact with the edging element having an elastic modulus at 10% elongation that is lower than the elastic modulus at 10% elongation of the polymer edging material, a transition element, made of a polymer transition material, being at least partially in contact, on its axially outer face, with the polymer edging material and, on its axially inner face, with a polymer filling material, the radially outer and radially inner ends of the transition element being respectively radially on the outside and radially on the inside of the end of the turn-up the elastic modulus at 10% elongation of the polymer transition material is somewhere between the respective elastic moduluses at 10% elongation of the polymer edging material and of the polymer filling material with which the transition element is in contact.

According to the invention, it is advantageous to have a transition element, made of a polymer transition material, at least partially in contact, on its axially outer face, with the polymer edging material and, on its axially inner face, with a polymer filling material. This is because adding a transition element in between the edging element and the filling material axially on the inside of the end of the turn-up makes it possible locally, in the polymer materials situated in close proximity to the end of the turn-up, to limit the levels of stress and deformation which dictate the rate at which cracks starting at the end of the turn-up spread.

It is also advantageous to have the radially outer and radially inner ends of the transition element respectively radially on the outside and radially on the inside of the end of the turn-up. Having the end of the turn-up positioned radially between the two, respectively radially outer and radially inner, ends of the transition element makes it possible to guarantee contact between the end of the turn-up and the transition element, bearing in mind the tolerances, inherent to the manufacturing process, on the radial positioning of the end of the turn-up.

Finally, the elastic modulus at 10% elongation of the polymer transition material is advantageously somewhere between the respective elastic moduluses at 10% elongation of the polymer edging material and of the polymer filling material with which the transition element is in contact. The progressive decrease in the elastic moduluses at 10% elongation when making the transition from the polymer edging material to the polymer transition material and then to the polymer filling material allows a decreasing and progressive stiffness gradient, making it possible to reduce the stresses and deformations at the end of the turn-up and, therefore, making it possible to slow the spread of cracks.

The greater the difference between the respective elastic moduluses at 10% elongation of the polymer edging material and of the polymer filling material, the more significant the advantage afforded by the elastic modulus at 10% elongation of the polymer transition material. In the example of a tire according to the invention under study here, the elastic modulus at 10% elongation of the polymer edging material is equal to 1.6 times the elastic modulus at 10% elongation of the polymer filling material.

According to one embodiment of the invention, the thickness of the transition element is at least equal to 0.25 times the distance between the end of the turn-up and the main part. It is the constant thickness of the transition element measured away from the tapered regions at the ends of the transition element that is referred to as the thickness of the transition element. The distance between the end of the turn-up and the main part is the distance measured, along the straight line passing through the end of the turn-up and perpendicular to the main part, between the axially inner generatrix of the reinforcing elements of the turn-up and the axially outer generatrix of the reinforcing elements of the main part. This minimum thickness of the transition element makes it possible to establish a minimum stiffness gradient that allows the rate of spread of cracks to be decreased.

The thickness of the transition element is advantageously at most equal to 0.60 times the distance between the end of the turn-up and the main part. Specifically, the dissipation of heat of the polymer transition material is greater than that of the polymer filling material because of its higher elastic modulus at 10% elongation. As a result, too great a volume of polymer transition material will lead to an increase in bead temperature that is detrimental to its life, hence the importance of placing a maximum limit value on the thickness of the transition element.

It is advantageous for the distance between the radially outer end of the transition element and the end of the turn-up to be at least equal to 2 times the distance between the end of the turn-up and the main part. This distance is measured between the straight line passing through the radially outer end of the transition element and parallel to the straight line passing through the end of the turn-up and perpendicular to the main part, and the straight line passing through the end of the turn-up and perpendicular to the main part. This minimum distance guarantees that the transition element will have a presence axially on the outside of the end of the turn-up, the radial position of which is subject to vary given the manufacturing tolerances.

It is also advantageous for the distance between the radially outer end of the transition element and the end of the turn-up to be at most equal to 4 times the distance between the end of the turn-up and the main part. The portion of transition element beyond this maximum distance on the one hand accentuates the dissipation of heat in the bead, which is detrimental to the bead without being of use for compensating for any uncertainty on the radial positioning of the end of the turn-up, hence resulting in a needless additional cost in polymer transition material.

Another advantageous embodiment of the invention is for the distance between the radially inner end of the transition element and the end of the turn-up to be at least equal to 2 times the distance between the end of the turn-up and the main part. This distance is measured between the straight line passing through the radially inner end of the transition element and parallel to the straight line passing through the end of the turn-up and perpendicular to the main part, and the straight line passing through the end of the turn-up and perpendicular to the main part. This minimum distance makes it possible to guarantee a minimum area of contact between the turn-up and the transition element and to guarantee the coverage of the end of the turn-up bearing in mind the tolerances, inherent to the manufacturing process, on the radial positioning at the end of the turn-up.

It is further advantageous for the distance between the radially inner end of the transition element and the end of the turn-up to be at most equal to 6 times the distance between the end of the turn-up and the main part. Specifically, beyond this maximum distance the portion of transition element firstly accentuates the dissipation of heat in the bead, which is detrimental to the bead, and secondly is of no use either to ensuring adhesion between the turn-up and the transition element or for compensating for any uncertainty on the radial positioning of the end of the turn-up, hence resulting in a needless additional cost in polymer transition material.

One advantageous embodiment of the invention is for the elastic modulus at 10% elongation of the polymer transition material to be at least equal to 0.9 times and at most equal to 1.1 times the arithmetic mean of the respective elastic moduluses at 10% elongation of the polymer edging material and of the polymer filling material. This range of values for the elastic modulus at 10% elongation of the polymer transition material guarantees a stiffness gradient between the stiffnesses of the respective edging, transition and filling compounds that allows a significant reduction in the rate of spread of cracks, by comparison with the reference tire bead that has no transition element, when the cracks spread from the polymer edging material to the polymer transition material and then to the polymer filling material.

Advantageously, the maximum distance between the turn-up and the main part is at least equal to 1.1 times the minimum distance between the turn-up and the main part. The result of this is that the filling element, comprised axially between the turn-up and the main part, has a narrowing resulting in closeness between the turn-up and the main part allowing the turn-up not to be placed under compression when the tire is being driven on.

It is also advantageous for the distance from the point of the turn-up, which point is positioned at the minimum distance axially on the outside of the main part, to the reference line of the rim to be at least equal to 1.25 times and at most equal to 2.5 times the distance from the radially outermost point of the rim to the reference line of the rim, and for the distance from the point of the turn-up, which point is positioned at the maximum distance axially on the outside of the main part, to the reference line of the rim to be at least equal to 2 times and at most equal to 4 times the distance from the radially outermost point of the rim to the reference line of the rim. The reference line of the rim usually, to a person skilled in the art, corresponds to the seat diameter. The distance from the radially outermost point of the rim to the reference line of the rim defines the height of the rim flange. Radially positioning the points of the turn-up that are respectively closest and furthest away from the main part within these ranges of values optimizes tensions and guarantees that there will be no compression in the turn-up.

Advantageously also, with each bead comprising a protective element radially extending one sidewall inwards and a filler element axially on the inside of the protective element and of the sidewall and axially on the outside of the turn-up, the protective and filler elements being made respectively of at least a polymer protective material and a polymer filler material, the polymer filler material having an elastic modulus at 10% elongation that is lower than the elastic modulus at 10% elongation of the polymer coating material, a transition element, made of a polymer transition material, is in contact, via its axially inner face, with the polymer coating material of the axially outer face of the turn-up and, via its axially outer face, with the polymer filler material, and the elastic modulus at 10% elongation of the polymer transition material is somewhere between the respective elastic moduluses at 10% elongation of the polymer coating material and of the polymer filler material. This transition element makes it possible to reduce the cracking that begins on the axially outer face of the turn-up and spreads through the polymer coating and filler materials. This reduction in cracking on the axially outer face of the turn-up contributes to improving the endurance of the bead and to increasing the life of the tire.

Advantageously and finally, with each bead comprising a filling element extending the bead wire radially outwards, the filling element being formed of at least two polymer filling materials, a first polymer filling material being radially further towards the inside and in contact with the bead wire, a second polymer filling material being radially on the outside of the first polymer filling material and having an elastic modulus at 10% elongation that is lower than the elastic modulus at 10% elongation of the first polymer filling material, a transition element, made of a polymer transition material, is in contact, via its radially inner face, with the first polymer filling material and is in contact, via its radially outer face, with the second polymer filling material, and the elastic modulus at 10% elongation of the polymer transition material is somewhere between the respective elastic moduluses at 10% elongation of the first and second polymer filling materials. This transition element makes it possible to reduce the cracking that starts at the surface of contact between a first polymer filling material that is radially furthest towards the inside and in contact with the bead wire and a second polymer filling material that is radially on the outside of the first polymer filling material. This reduced cracking at the interface between the first and second polymer filling materials contributes to improving the endurance of the bead and to increasing the life of the tire.

BRIEF DESCRIPTION OF THE FIGURES

The features of the invention will be better understood from the description of the attached FIGS. 1 and 2.

DETAILED DESCRIPTION OF SPECIFIC EMBODIMENTS

Figure 1:
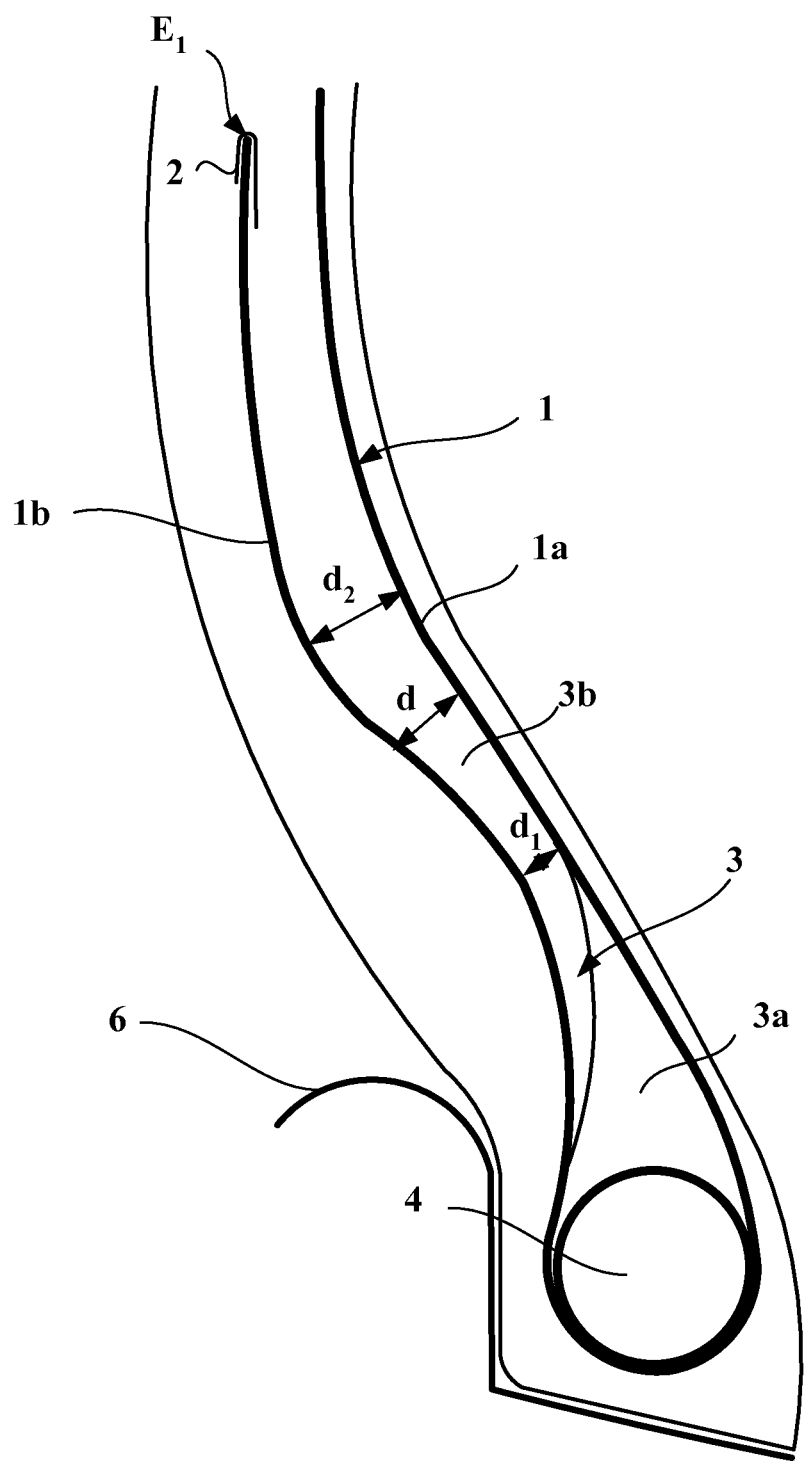
FIG. 1 is a view in section on a meridian plane of the bead of a tire for a heavy vehicle of construction plant type, of the prior art
Figure 2:
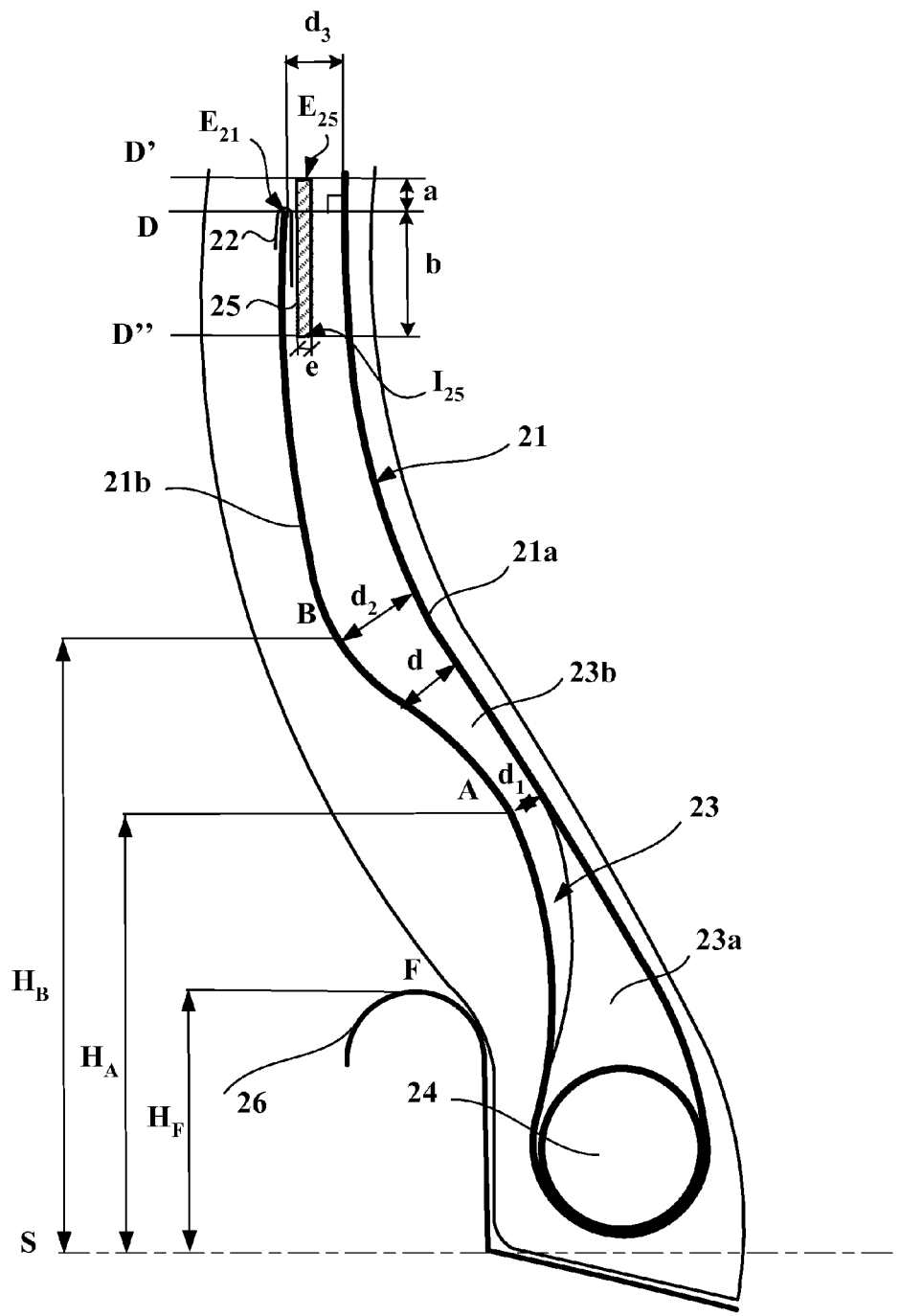
FIG. 2 is a view in section on a meridian plane of the bead of a tire for a heavy vehicle of construction plant type, according to the invention.

In order to make them easier to understand, FIGS. 1 and 2 are not drawn to scale.

FIG. 1 depicts a bead of a tire for a heavy vehicle of construction plant type of the prior art, comprising:
  a carcass reinforcement, comprising a single carcass reinforcement layer 1 made up of metallic reinforcing elements, with a main part 1a wrapped, from the inside towards the outside of the tire, around a bead wire 4 to form a turn-up 1b,
  the distance d between the turn-up 1b and the main part 1a decreasing continuously, radially towards the outside, from the bead wire 4, as far as a minimum distance $d_1$, then increasing continuously as far as a maximum distance $d_2$,
  an edging element 2 covering the end $E_1$ of the turn-up 1b, on its two respectively axially inner and axially outer, faces, and consisting of a polymer edging material of the same chemical composition as the polymer coating material,
  a filling element 3 extending the bead wire 4 radially outwards and formed of two polymer filling materials, a first polymer filling material 3a being radially on the outside and in contact with the bead wire 4, and a second polymer filling material 3b being radially on the outside and in contact with the first polymer filling material 3a.

FIG. 2 shows a bead of a tire for a heavy vehicle of construction plant type, according to the invention, comprising:
  a carcass reinforcement, comprising a single carcass reinforcement layer 21 made up of metallic reinforcing elements with a main part 21a, wrapped, from the inside towards the outside of the tire, around a bead wire 24 to form a turn-up 21b,
  the distance d between the turn-up 21b and the main part 21a decreasing continuously, radially towards the outside, from the bead wire 24, as far as a minimum distance $d_1$, then increasing continuously as far as a maximum distance $d_2$,
  an edging element 22 covering the end $E_{21}$ of the turn-up 21b, on its two, respectively axially inner and axially outer, faces, and consisting of a polymer edging material of the same chemical composition as the polymer coating material,
  a filling element 23 extending the bead wire 24 radially outwards and formed of two polymer filling materials, a first polymer filling material 23a being radially on the outside and in contact with the bead wire 24, and a second polymer filling material 23b being radially on the outside and in contact with the first polymer filling material 23a,
  a transition element 25, consisting of a polymer transition material, at least partially in contact, on its axially outer face, with the polymer edging material 22 and, on its axially inner face, with a polymer filling material 23b.

The geometry of the turn-up 21b is characterized by the point A of the turn-up 21b, which point is positioned at the minimum distance $d_1$ axially on the outside of the main part 21a and at a distance $H_A$ radially on the outside of a reference line S of the rim 26, and by the point B of the turn-up 21b, which point is positioned at the maximum distance $d_2$ axially on the outside of the main part 21a and at a distance $H_B$ radially on the outside of a reference line S of the rim 26. The respective positions of the points A and B are defined with respect to the radially outermost point F of the rim 26, which point is positioned at a distance $H_F$ radially on the outside of a reference line S of the rim 26.

The transition element 25 has a thickness e schematically depicted as being constant but which in actual fact usually is tapered at the ends $E_{25}$ and $I_{25}$. The length of the transition element 25 is a+b. The end $E_{21}$ of the turn-up 21b is positioned radially between the respectively radially outer $E_{25}$ and radially inner $I_{25}$ ends of the transition element 25.

The radially outer end $E_{25}$ of the transition element 25 is situated at a distance a from the end $E_{21}$ of the turn-up 21b. The distance a is the distance between the straight line D' passing through the radially outer end $E_{25}$ of the transition element 25 and parallel to the straight line D passing through the end $E_{21}$ of the turn-up 21b and perpendicular to the main part 21a, and the straight line D passing through the end $E_{21}$ of the turn-up 21b and perpendicular to the main part 21a.

The radially inner end $I_{25}$ of the transition element 25 is situated at a distance b from the end $E_{21}$ of the turn-up 21b. The distance b is the distance between the straight line D" passing through the radially inner end $I_{25}$ of the transition element 25 and parallel to the straight line D passing through the end $E_{21}$ of the turn-up 21b and perpendicular to the main part 21a, and the straight line D passing through the end $E_{21}$ of the turn-up 21b and perpendicular to the main part 21a.

The distance $d_3$ between the end $E_{21}$ of the turn-up 21b and the main part 21a is the distance measured, along the straight line D passing through the end $E_{21}$ of the turn-up 21b and perpendicular to the main part 21a, between the axially inner generatrix of the reinforcing elements of the turn-up 21b and the axially outer generatrix of the reinforcing elements of the main part 21a.

The invention has been studied more particularly in the case of a tire for a heavy vehicle of the dumper type of size 59/80R63. According to the European Tire and Rim Organisation, the nominal service conditions for such a tire are an inflation pressure of 6 bar, a static load of 99 tonnes and covering a distance of between 16 and 32 km each hour. In addition, the design section height H, within the meaning of the ETRTO standard, of such a tire is 1214 mm.

The 59/80R63 tire was designed according to the invention, as depicted schematically in FIG. 2, i.e. with a tall turn-up, the radial positioning of the end of which is in the vicinity of the axial straight line passing through the axially outermost points of the tire.

As far as the geometry of the turn-up 21b is concerned, the point A of the turn-up 21b is positioned at the minimum distance $d_1$ equal to 18 mm, axially on the outside of the main part 21a, and at a distance $H_A$ equal to 200 mm, radially on the outside of a reference line S of the rim 26. The point B of the turn-up 21b is positioned at the maximum distance $d_2$ equal to 27 mm, axially on the outside of the main part 21a, and at a distance $H_B$ equal to 390 mm, radially on the outside of a reference line S of the rim 26. The respective positions of the points A and B are defined with respect to the radially outermost point F of the rim 26, which point is positioned at a distance $H_F$ equal to 127 mm, radially on the outside of a reference line S of the rim 26.

The distance $d_3$ between the end $E_{21}$ of the turn-up 21b and the main part 21a is equal to 15 mm. The transition element 25, bounded by its respectively radially outer $E_{25}$ and radially inner $I_{25}$ ends, has a thickness e equal to 4.5 mm, namely 0.30 times the distance $d_3$. The radially outer end $E_{25}$ of the transition element 25 is positioned at a distance equal to 45 mm, namely 3 times the distance $d_3$. The radially inner end $I_{25}$ of the transition element 25 is positioned at the distance b equal to 75 mm, namely 5 times the distance $d_3$.

The elastic modules at 10% elongation of the polymer edging material 22, transition material 25 and filling material 23b are respectively equal to 6 MPa, 4.8 MPa and 3.5 MPa. As a result, the elastic modulus at 10% elongation of the polymer transition material 25 is equal to the arithmetic mean of the respective elastic moduluses at 10% elongation of the polymer edging material 22 and filling material 23b.

Simulations of finite-element calculations were carried out respectively on a reference tire, as depicted in FIG. 1, and on a tire according to the invention, as depicted in FIG. 2. For the reference tire, the elongation of the polymer filling material 3b in the end zone $E_1$ of the turn-up 1b, on the axially inner face of the turn-up of carcass reinforcement 1b, is equal to 1.4 times the elongation of the polymer edging material 2 in contact with it, these elongations being parallel to the turn-up 1b. As a result, when a crack spreads from the polymer edging material 2 towards the polymer filling material 3b, the rate at which it spreads in the polymer filling material 3b increases because of the greater elongation of the polymer filling material 3b by comparison with the polymer edging material 2. For the tire according to the invention, the elongation of the polymer transition material 25 in the end zone $E_{21}$ of the turn-up 21b, on the axially inner face of the turn-up, is equal to 0.9 times the elongation of the polymer edging material 22. As a result, when a crack spreads from the polymer edging material 22 towards the polymer transition material 25, the rate at which it spreads in the polymer transition material 25 decreases because of the lesser elongation of the polymer transition material 25 by comparison with the polymer edging material 22.

The invention should not be interpreted as being restricted to the example illustrated in FIG. 2, but may be extended to other alternative forms of embodiment such as, although this list is not exhaustive:

- a polymer edging material with a chemical composition different from that of the polymer coating material,
- an absence of edging material leading to direct contact between the axially outer face of the transition element and the polymer coating material coating the axially inner face of the turn-up of carcass reinforcement,
- a transition element comprising several layers of polymer transition materials in contact two by two and of radial direction,
- a turn-up the end of which is positioned radially closer to the bead wire than is the case in FIG. 2.

The invention claimed is:

1. A tire for a heavy vehicle of construction plant type comprising two beads intended to come into contact with a rim, a carcass reinforcement comprising at least one carcass reinforcement layer made up of metallic reinforcing elements, the carcass reinforcement layer comprising a main part wrapped, within each bead, from the inside towards the outside of the tire, around a bead wire to form a turn-up, a distance (d) between the turn-up and the main part decreasing continuously, radially towards the outside, from the bead wire, as far as a minimum distance ($d_1$), then increasing continuously as far as a maximum distance ($d_2$), the turn-up comprising an end covered by an edging element made of a polymer edging material, each bead comprising a filling element extending the bead wire radially towards the outside and made of at least one polymer filling material, the polymer filling material in contact with the edging element having an elastic modulus at 10% elongation that is lower than the elastic modulus at 10% elongation of the polymer edging material, wherein a transition element, made of a polymer transition material, is at least partially in contact, on an axially outer face thereof, with the polymer edging material and, on an axially inner face thereof, with a polymer filling material, wherein a radially outer and radially inner end of the transition element are respectively radially on the outside and radially on the inside of the end of the turn-up and wherein the elastic modulus at 10% elongation of the polymer transition material is somewhere between the respective elastic moduluses at 10% elongation of the polymer edging material and of the polymer filling material with which the transition element is in contact.

2. The tire for a heavy vehicle of construction plant type according to claim 1, wherein a thickness (e) of the transition element is at least equal to 0.25 times the distance ($d_3$) between the end of the turn-up and the main part.

3. The tire for a heavy vehicle of construction plant type according to claim 1, wherein a thickness (e) of the transition element is at most equal to 0.60 times the distance ($d_3$) between the end of the turn-up and the main part.

4. The tire for a heavy vehicle of construction plant type according to claim 1, wherein a distance (a) between the radially outer end of the transition element and the end of the turn-up is at least equal to 2 times the distance ($d_3$) between the end of the turn-up and the main part.

5. The tire for a heavy vehicle of construction plant type according to claim 1, wherein a distance (a) between the radially outer end of the transition element and the end of the turn-up is at most equal to 4 times the distance ($d_3$) between the end of the turn-up and the main part.

6. The tire for a heavy vehicle of construction plant type according to claim 1, wherein a distance (b) between the radially inner end of the transition element and the end of the turn-up of carcass reinforcement is at least equal to 2 times the distance ($d_3$) between the end of the turn-up and the main part.

7. The tire for a heavy vehicle of construction plant type according to claim 1, wherein a distance (b) between the radially inner end of the transition element and the end of the turn-up is at most equal to 6 times the distance ($d_3$) between the end of the turn-up and the main part.

8. The tire for a heavy vehicle of construction plant type according to claim 1, wherein the elastic modulus at 10% elongation of the polymer transition material is at least equal to 0.9 times and at most equal to 1.1 times the arithmetic mean of the respective elastic moduluses at 10% elongation of the polymer edging material and of the polymer filling material.

9. The tire for a heavy vehicle of construction plant type according to claim 1, wherein the maximum distance ($d_2$) between the turn-up and the main part is at least equal to 1.1 times the minimum distance ($d_1$) between the turn-up and the main part.

10. The tire for a heavy vehicle of construction plant type according to claim 1, mounted on a rim and comprising a point A of the turn up, which point is positioned at the minimum distance ($d_1$) axially on the outside of the main part and at a distance ($H_A$) radially on the outside of a reference line (S) of the rim, the radially outermost point F of the rim being positioned at a distance ($H_F$) radially on the outside of a reference line (S) of the rim, wherein the distance ($H_A$) from the point A of the turn-up, which point is positioned at the minimum distance ($d_1$) axially on the outside of the main part, to the reference line (S) of the rim is at least equal to 1.25 times and at most equal to 2.5 times the distance ($H_F$) from the radially outermost point F of the rim to the reference line (S) of the rim.

11. The tire for a heavy vehicle of a construction plant type according to claim 1, mounted on a rim, and comprising a point B of the turn-up, which point is positioned at the maximum distance ($d_2$) axially on the outside of the main part and at a distance ($H_B$) radially on the outside of a reference line (S) of the rim, the radially outermost point F of the rim being positioned at a distance ($H_F$) radially on the outside of a reference line (S) of the rim, wherein the distance ($H_B$) from the point B of the turn-up, which point is positioned at the maximum distance ($d_2$) axially on the outside of the main part, to the reference line (S) of the rim is at least equal to 2 times and at most equal to 4 times the distance ($H_F$) from the radially outermost point F of the rim to the reference line (S) of the rim.

* * * * *